(12) United States Patent
Susko

(10) Patent No.: US 12,179,636 B2
(45) Date of Patent: Dec. 31, 2024

(54) VEHICLE SEATING ASSEMBLY

(71) Applicant: Ford Global Technologies, LLC, Dearborn, MI (US)

(72) Inventor: Thomas J. Susko, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 17/963,372

(22) Filed: Oct. 11, 2022

(65) Prior Publication Data
US 2024/0116401 A1 Apr. 11, 2024

(51) Int. Cl.
*B60N 2/02* (2006.01)
*B60N 2/12* (2006.01)

(52) U.S. Cl.
CPC ........... *B60N 2/02246* (2023.08); *B60N 2/12* (2013.01); *B60N 2/02253* (2023.08)

(58) Field of Classification Search
CPC .. B60N 2/02246; B60N 2/12; B60N 2/02253; B60N 2/1695; B60N 2/1842; B60N 2/1615; B60N 2/165; B60N 2/1803; B60N 2/1807; B60N 2/1853; B60N 2/1864
See application file for complete search history.

(56) References Cited

U.S. PATENT DOCUMENTS

| 12,090,895 B2 * | 9/2024 | Kapusky | B60N 2/02246 |
| 2017/0334314 A1 * | 11/2017 | Takada | B60N 2/02246 |
| 2019/0225130 A1 * | 7/2019 | Kish | B60N 2/12 |
| 2022/0176850 A1 * | 6/2022 | Kulhawik | B60N 2/1835 |
| 2024/0034214 A1 * | 2/2024 | Maloney | B60N 2/10 |

FOREIGN PATENT DOCUMENTS

| CN | 109050355 A | 12/2018 |
| CN | 113715699 A | 11/2021 |
| CN | 113829968 A | 12/2021 |
| CN | 215971203 U | 3/2022 |
| CN | 114407738 A | 4/2022 |
| CN | 216359926 U | 4/2022 |
| CN | 216636262 U | 5/2022 |
| CN | 216684156 U | 6/2022 |
| CN | 114851926 A | 8/2022 |

* cited by examiner

*Primary Examiner* — Mark R Wendell
(74) *Attorney, Agent, or Firm* — Vichit Chea; Price Heneveld LLP

(57) ABSTRACT

A vehicle seating assembly includes a seat base, a seatback, a track assembly, a front actuator assembly, and a rear actuator assembly. The seat base includes forward and rearward regions. The seatback is pivotably coupled to the seat base proximate to the rearward region. The track assembly is coupled to the seat base. The track assembly includes an upper track and a lower track. The upper track is movable relative to the lower track. The front actuator assembly couples the seat base to the upper track proximate to the forward region. The rear actuator assembly couples the seat base to the upper track proximate to the rearward region. The vehicle seating assembly is movable between a design position, a lowered position, a raised position, and a reclined-and-raised position by adjusting at least one component chosen from the front actuator assembly and the rear actuator assembly.

18 Claims, 8 Drawing Sheets

VEHICLE SEATING ASSEMBLY

FIELD OF THE DISCLOSURE

The present disclosure generally relates to seating assemblies. More specifically, the present disclosure relates to vehicle seating assemblies.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a vehicle seating assembly includes a seat base, a seatback, a track assembly, a front actuator assembly, and a rear actuator assembly. The seat base includes a forward region and a rearward region. The seatback is pivotably coupled to the seat base proximate to the rearward region. The track assembly is coupled to the seat base. The track assembly includes an upper track and a lower track. The upper track is movable relative to the lower track. The front actuator assembly couples the seat base to the upper track proximate to the forward region. The front actuator assembly adjusts a distance between an underside of the forward region of the seat base and the upper track. The rear actuator assembly couples the seat base to the upper track proximate to the rearward region. The rear actuator assembly adjusts a distance between an underside of the rearward region of the seat base and the upper track. The vehicle seating assembly is movable between a design position, a lowered position, a raised position, and a reclined-and-raised position by adjusting at least one component chosen from the front actuator assembly and the rear actuator assembly.

Embodiments of the first aspect of the disclosure can include any one or a combination of the following features:
- an angular relationship between the front actuator assembly and the upper track is adjusted as the vehicle seating assembly is transitioned between the design position, the lowered position, the raised position, and the reclined-and-raised position;
- an angular relationship between the front actuator assembly and the seat base is adjusted as the vehicle seating assembly is transitioned between the design position, the lowered position, the raised position, and the reclined-and-raised position;
- an angular relationship between at least one component of the rear actuator assembly and the upper track is adjusted as the vehicle seating assembly is transitioned between the design position, the lowered position, the raised position, and the reclined-and-raised position;
- an angular relationship between the at least one component of the rear actuator assembly and the seat base is adjusted as the vehicle seating assembly is transitioned between the design position, the lowered position, the raised position, and the reclined-and-raised position;
- the front actuator assembly is a linear actuator assembly;
- the front actuator assembly includes a motor, a lead shaft that is rotated when the motor is activated, a nut that engages the lead shaft such that a position of the nut along the lead shaft is adjusted when the lead shaft is rotated, and a nut anchor that couples the nut to the seat base, wherein the nut anchor prevents rotation of the nut;
- the rear actuator assembly is a sector gear and pinion arrangement;
- the rear actuator assembly includes a motor that is coupled to the seat base, a sector gear that engages with the motor, wherein the sector gear defines a slot, and a guide pin that is coupled to the seat base, wherein the guide pin is received in the slot defined by the sector gear;
- wherein transitioning from the design position to the reclined-and-raised position includes adjusting a position of the nut along the lead shaft of the front actuator assembly such that the nut moves away from the motor, rotating the front actuator assembly away from the upper track, and rotating the sector gear of the rear actuator assembly toward the upper track; and
- transitioning from the design position to the reclined-and-raised position includes decreasing a distance between the rearward region of the seat base and the upper track, as well as increasing a distance between the forward region of the seat base and the upper track.

According to a second aspect of the present disclosure, a vehicle seating assembly includes a seat base, a seatback, a track assembly, a front actuator assembly, and a rear actuator assembly. The seat base includes a forward region and a rearward region. The seatback is pivotably coupled to the seat base proximate to the rearward region. The track assembly is coupled to the seat base. The track assembly includes an upper track and a lower track. The upper track is movable relative to the lower track. The front actuator assembly couples the seat base to the upper track proximate to the forward region. The front actuator assembly adjusts a distance between an underside of the forward region of the seat base and the upper track. An angular relationship between the front actuator assembly and the upper track is adjusted as the vehicle seating assembly is transitioned between the design position, the lowered position, the raised position, and the reclined-and-raised position. An angular relationship between the front actuator assembly and the seat base is adjusted as the vehicle seating assembly is transitioned between the design position, the lowered position, the raised position, and the reclined-and-raised position. The rear actuator assembly couples the seat base to the upper track proximate to the rearward region. The rear actuator assembly adjusts a distance between an underside of the rearward region of the seat base and the upper track. The vehicle seating assembly is movable between a design position, a lowered position, a raised position, and a reclined-and-raised position by adjusting at least one component chosen from the front actuator assembly and the rear actuator assembly.

Embodiments of the second aspect of the present disclosure can include any one or a combination of the following features:
- an angular relationship between the rear actuator assembly and the upper track is adjusted as the vehicle seating assembly is transitioned between the design position, the lowered position, the raised position, and the reclined-and-raised position;
- an angular relationship between the front actuator assembly and the seat base is adjusted as the vehicle seating assembly is transitioned between the design position, the lowered position, the raised position, and the reclined-and-raised position;
- the front actuator assembly is a linear actuator assembly;

the front actuator assembly includes a motor, a lead shaft that is rotated when the motor is activated, a nut that engages the lead shaft such that a position of the nut along the lead shaft is adjusted when the lead shaft is rotated, and a nut anchor that couples the nut to the seat base, wherein the nut anchor prevents rotation of the nut;

the rear actuator assembly is a sector gear and pinion arrangement;

the rear actuator assembly includes a motor that is coupled to the seat base, a sector gear that engages with the motor, wherein the sector gear defines a slot, and a guide pin that is coupled to the seat base, wherein the guide pin is received in the slot defined by the sector gear;

transitioning from the design position to the reclined-and-raised position includes adjusting a position of the nut along the lead shaft of the front actuator assembly such that the nut moves away from the motor, rotating the front actuator assembly away from the upper track, and rotating the sector gear of the rear actuator assembly toward the upper track; and transitioning from the design position to the reclined-and-raised position includes decreasing a distance between the rearward region of the seat base and the upper track, as well as increasing a distance between the forward region of the seat base and the upper track.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
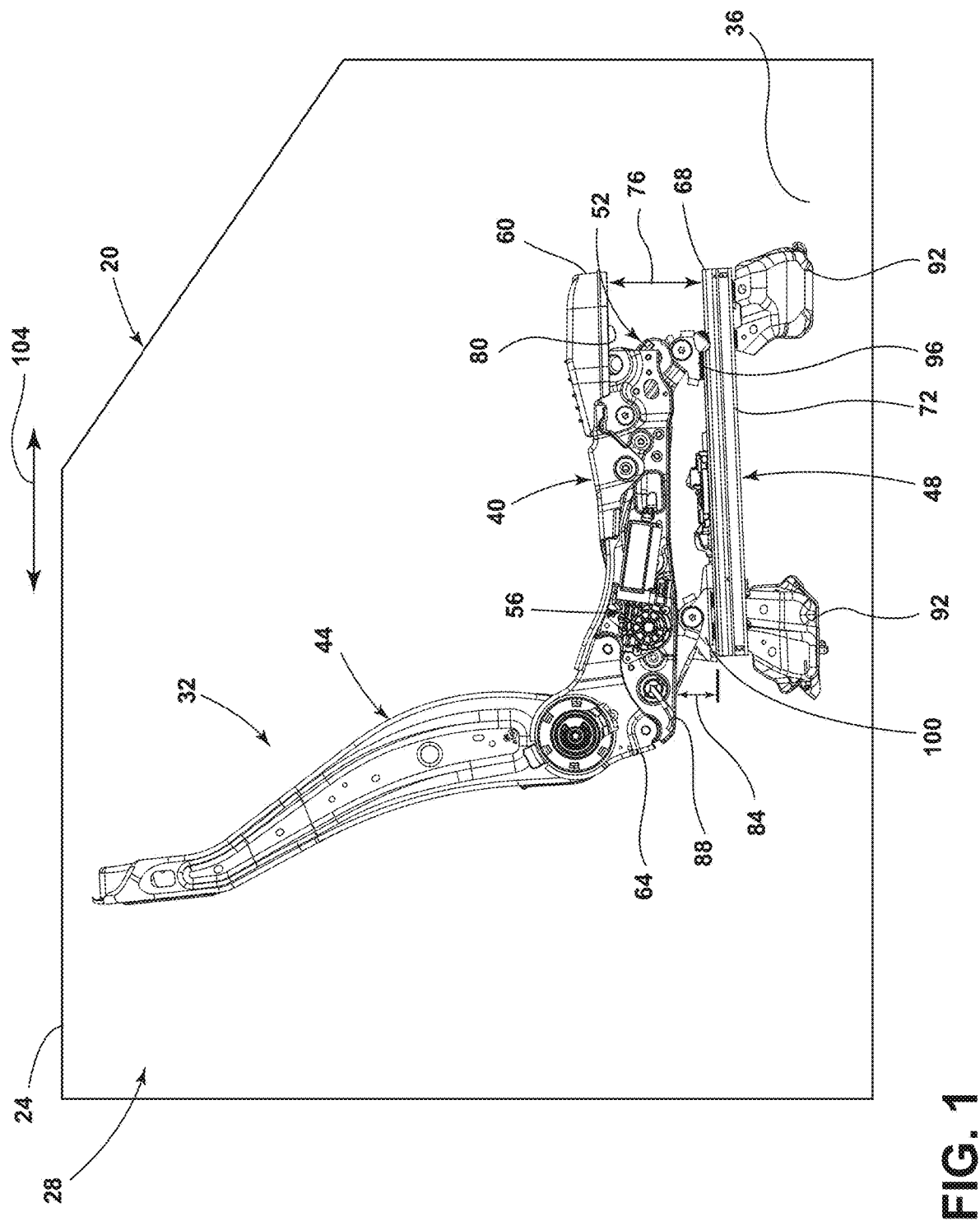
FIG. 1 is a side view of a vehicle seating assembly within a passenger compartment, illustrating various components thereof, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-8, reference numeral 20 generally designates a vehicle. The vehicle 20 includes a body 24 that defines a passenger compartment 28. The passenger compartment 28 may be provided with one or more vehicle seating assemblies 32. The vehicle seating assembly 32 is coupled to a floor 36 of the passenger compartment 28, The vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many, or all, commuting independent of user interaction while the user maintains override control of the vehicle 20.

Referring again to FIGS. 1-8, the vehicle seating assembly 32 includes a seat base 40, a seatback 44, a track assembly 48, a front actuator assembly 52, and a rear actuator assembly 56. The seat base 40 includes a forward region 60 and a rearward region 64. The seatback 44 is pivotably coupled to the seat base 40 proximate to the rearward region 64. The track assembly 48 is coupled to the seat base 40. The track assembly 48 includes an upper track 68 and a lower track 72. The upper track 68 is movable relative to the lower track 72. The front actuator assembly 52 couples the seat base 40 to the upper track 68 proximate to the forward region 60. The front actuator assembly 52 adjusts a distance 76 between an underside 80 of the forward region 60 of the seat base 40 and the upper track 68. The rear actuator assembly 56 couples the seat base 40 to the upper track 68 proximate to the rearward region 64. The rear actuator assembly 56 adjusts a distance 84 between an underside 88 of the rearward region 64 of the seat base 40 and the upper track 68. The vehicle seating assembly 32 is movable between a design position (FIGS. 1, 2, and 5), a lowered position (FIG. 6), a raised position (FIG. 7), and a reclined-and-raised position (FIGS. 3, 4, and 8) by adjusting at least one component chosen from the front actuator assembly 52 and the rear actuator assembly 56. The reclined-and-raised position of the vehicle seating assembly 32 is intended for use when the vehicle 20 is in a stationary (i.e., non-moving) state. For example, while a transmission of the vehicle 20 is in a parked position. However, while all modern OEMs of passenger vehicles currently warn occupants against reclining the vehicle seating assembly 32 past a certain angle while the vehicle 20 is moving and/or in riding in a fully reclined or supine position due to safety concerns, it is anticipated that technology and the regulatory framework may evolve in the future where such an activity is permissible.

Figure 2:
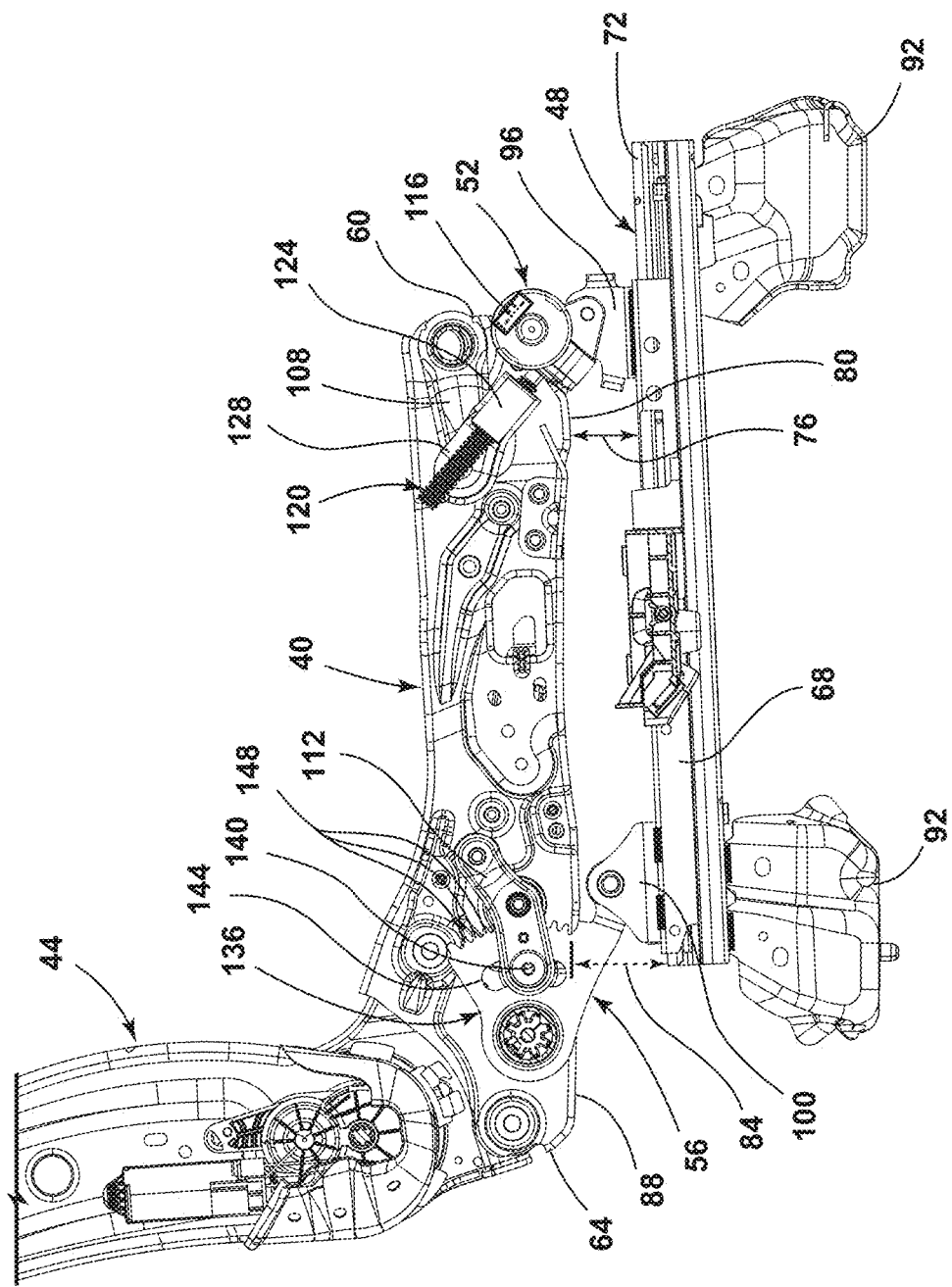
FIG. 2 is an expanded side view of the vehicle seating assembly in a design position, illustrating a front actuator assembly and a rear actuator assembly, according to one example.

With specific reference to FIGS. 1 and 2, the vehicle seating assembly 32 may be coupled to the floor 36 of the passenger compartment 28 by one or more legs 92. The legs 92 may be coupled to the lower track 72 of the track assembly 48. The front actuator assembly 52 may be coupled to the upper track 68 by a front anchor 96. Similarly, the rear actuator assembly 56 may be coupled to the upper track 68 by a rear anchor 100. The coupling between the front anchor 96 and the front actuator assembly 52 is accomplished in a manner that permits rotational motion of the front actuator assembly 52 relative to the front anchor 96. Similarly, the coupling between the rear anchor 100 and the rear actuator assembly 56 is accomplished in a manner that permits rotational motion of the rear actuator assembly 56 relative to the rear anchor 100. More specifically, at least one component of the rear actuator assembly 56 may rotate relative to the rear anchor 100, as will be discussed further herein. Accordingly, the front actuator assembly 52 and at least one component of the rear actuator assembly 56 may be adjusted in their angular relationship with the front anchor 96 and the rear anchor 100, respectively.

Referring again to FIGS. 1 and 2, the upper track 68 is movable relative to the lower track 72. Such an arrangement permits slidable motion in a longitudinal direction of the passenger compartment 28, as indicated by arrow 104. The slidable motion of the upper track 68 relative to the lower track 72 along the longitudinal direction is capable of adjusting the relative position of the seat base 40, the seatback 44, the front actuator assembly 52, and the rear actuator assembly 56 relative to the lower track 72 and the legs 92. A front mounting member 108 may couple the front actuator assembly 52 to the seat base 40. Similarly, a rear mounting member 112 may couple the rear actuator assembly 56 to the seat base 40. In some examples, the positioning of the front mounting member 108 and the rear mounting member 112 relative to the seat base 40 may be fixed. Said another way, the front mounting member 108 and the rear mounting member 112 may not move relative to the seat base 40 as the vehicle seating assembly 32 is transitioned between the various positions.

Figure 3:
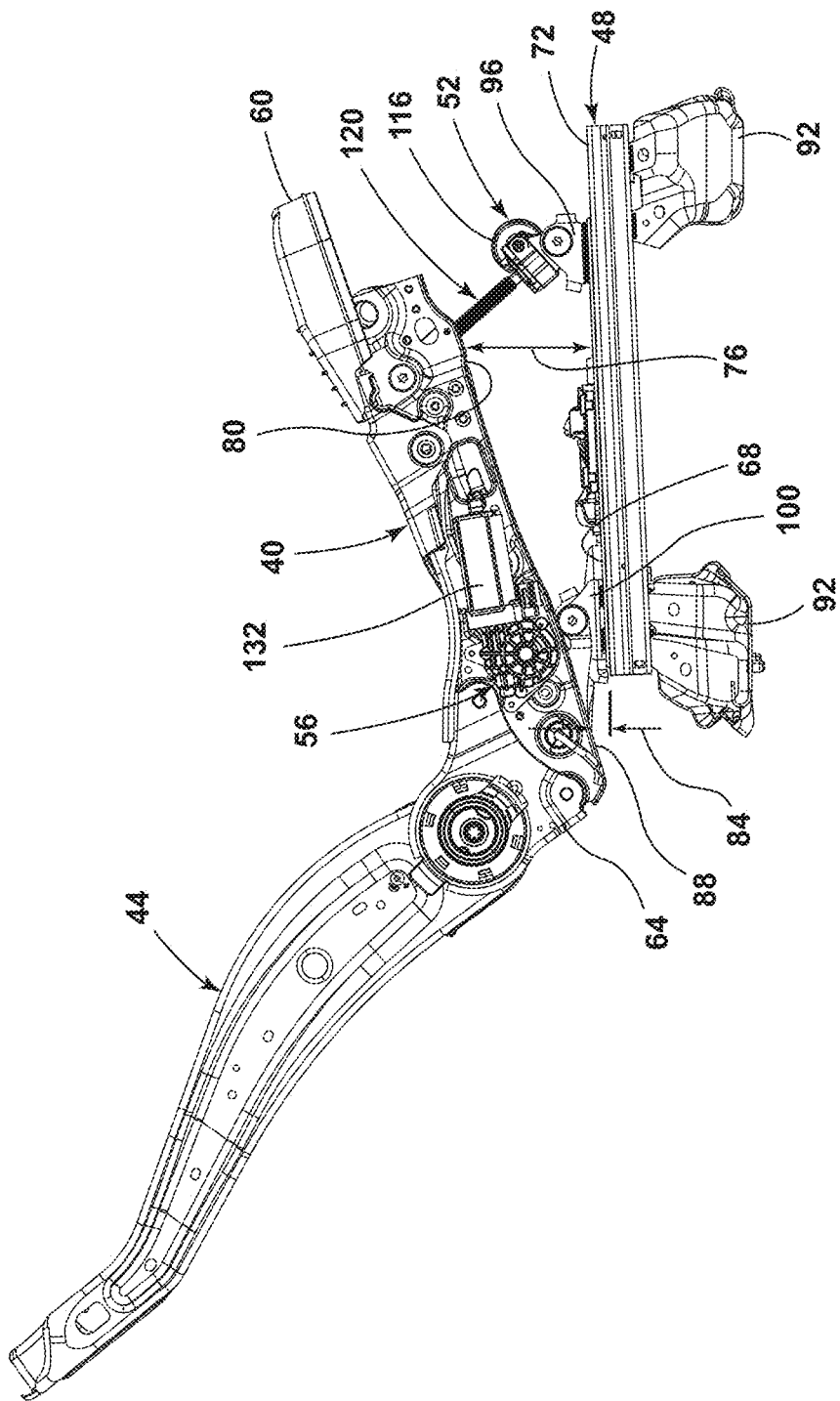
FIG. 3 is a side view of the vehicle seating assembly, illustrating a reclined-and-raised position, according to one example.
Figure 4:
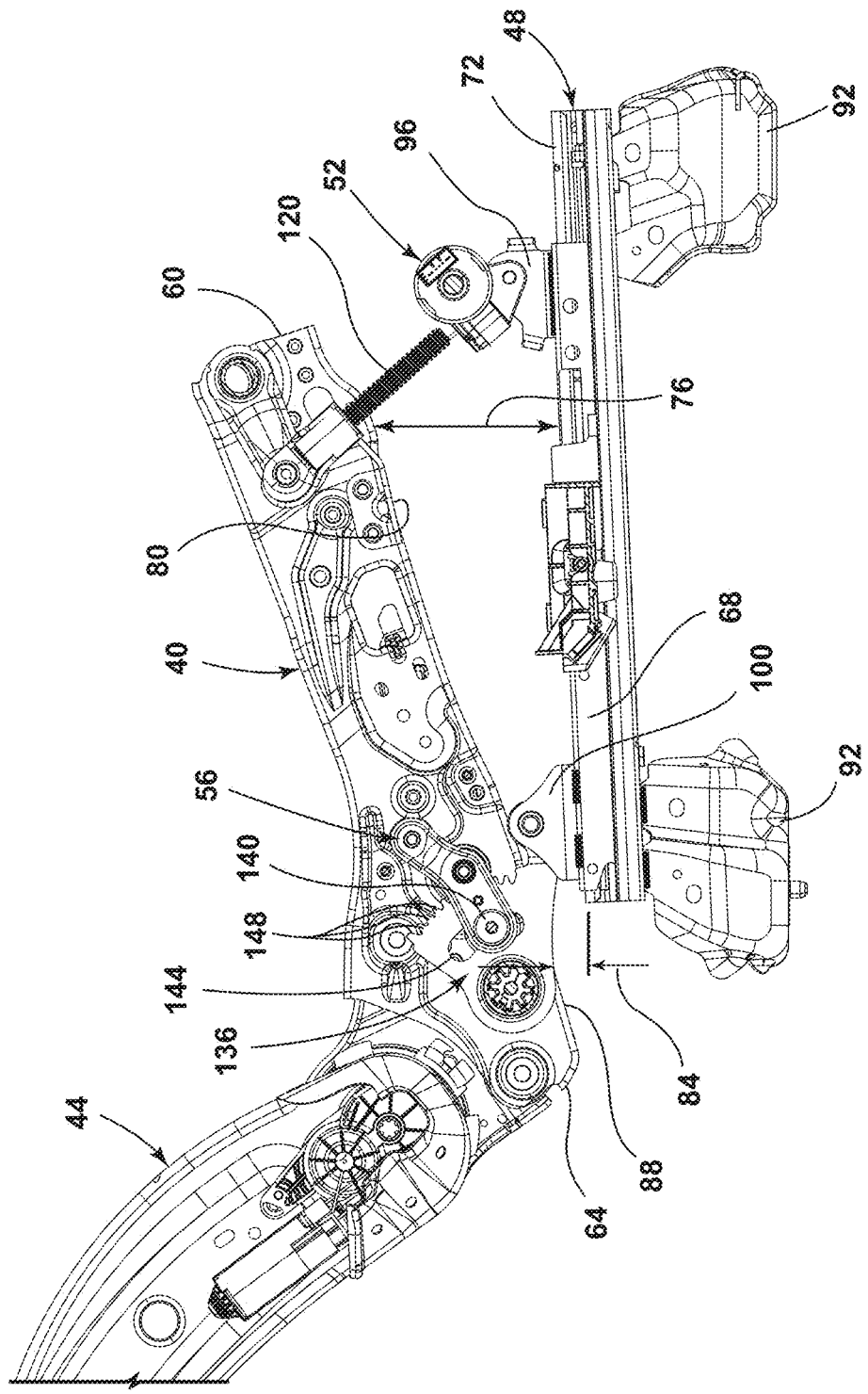
FIG. 4 is an expanded side view of the vehicle seating assembly in the reclined-and-raised position, illustrating positioning of the front actuator assembly and the rear actuator assembly, according to one example.
Figure 5:
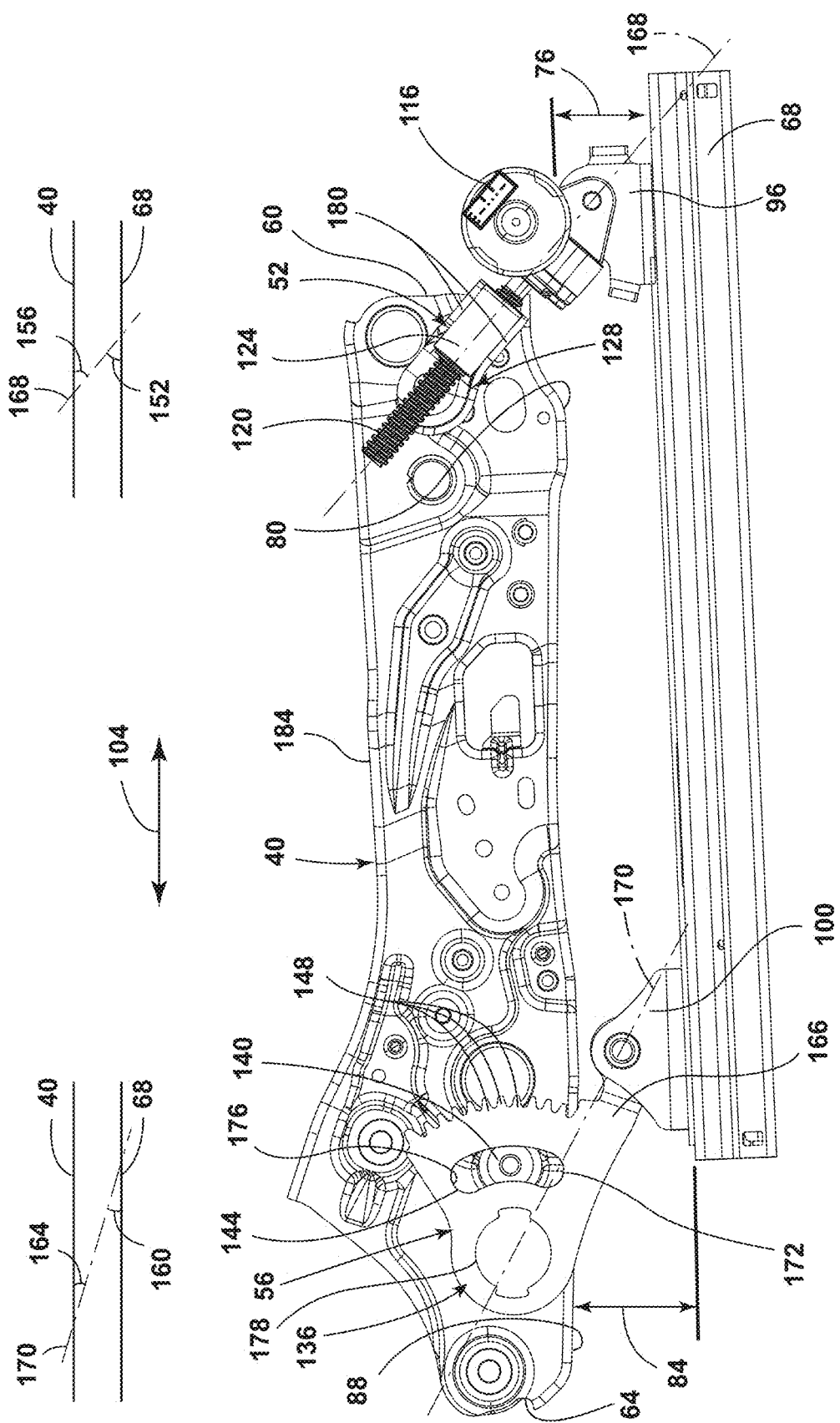
FIG. 5 is a side view of a seat base, a portion of a track assembly, the front actuator assembly, and the rear actuator assembly, illustrating the design position of the vehicle seating assembly, according to one example.
Figure 6:
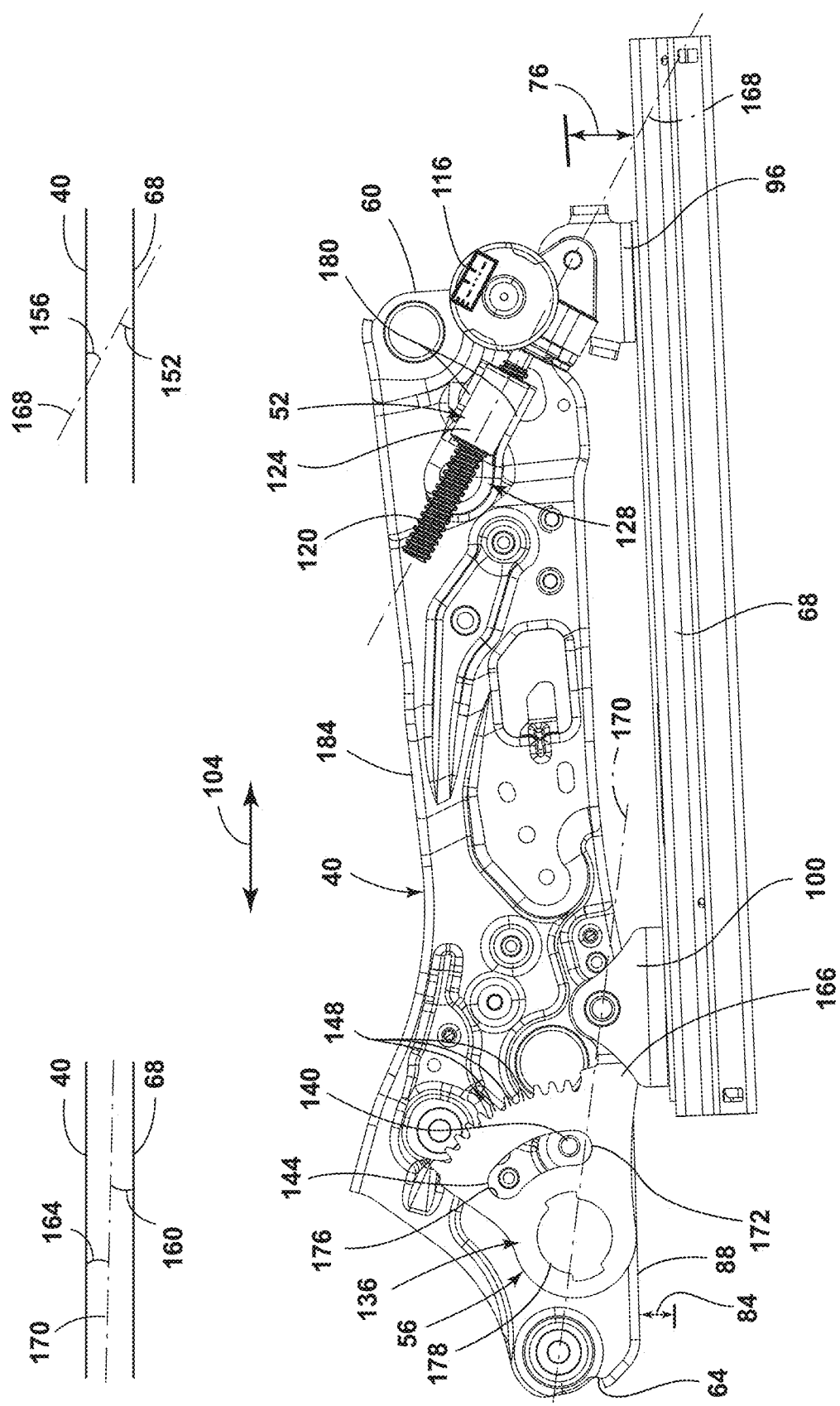
FIG. 6 is a side view of the seat base, the portion of the track assembly, the front actuator assembly, and the rear actuator assembly, illustrating a lowered position of the vehicle seating assembly, according to one example.
Figure 7:
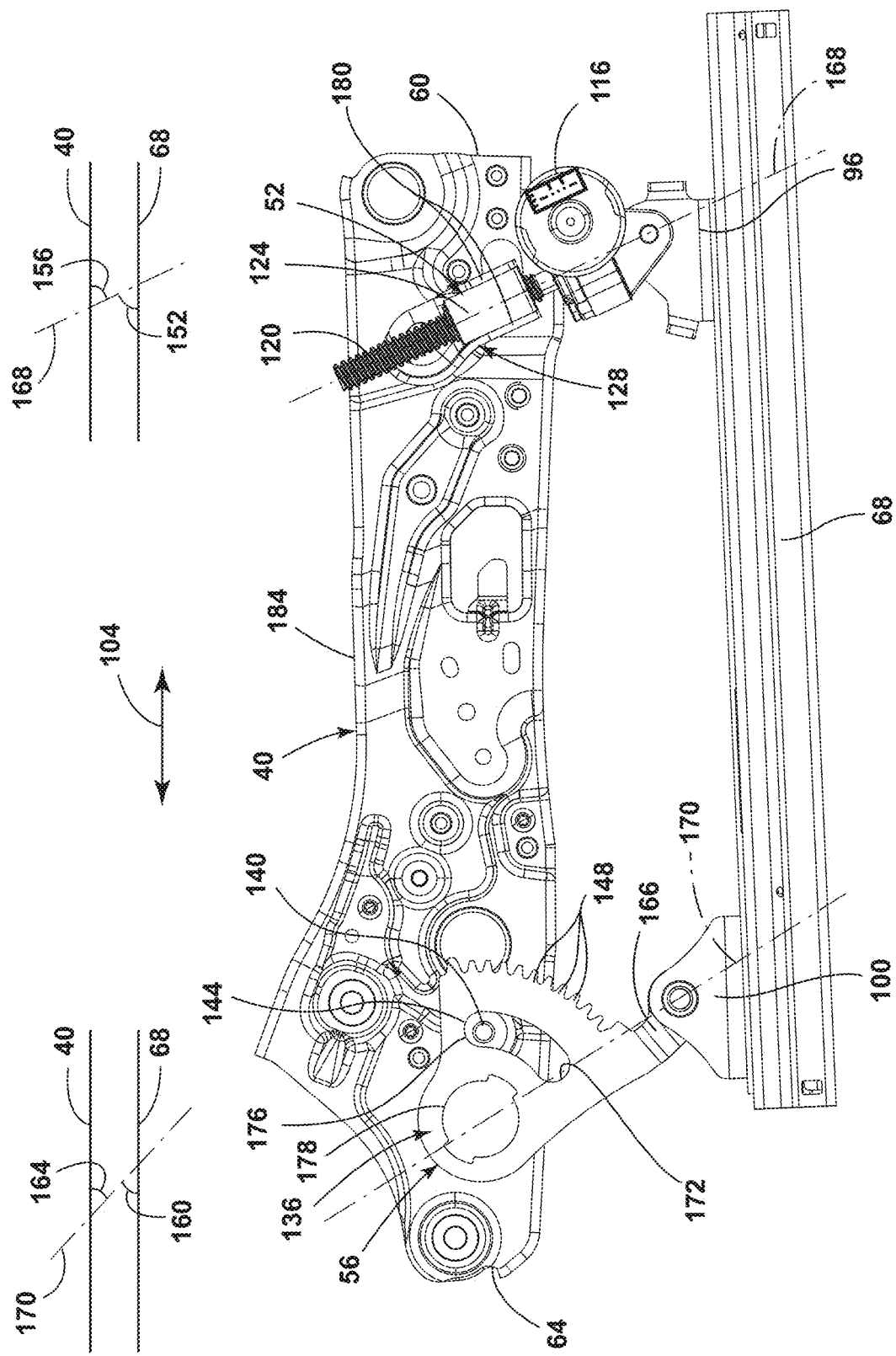
FIG. 7 is a side view of the seat base, the portion of the track assembly, the front actuator assembly, and the rear actuator assembly, illustrating a raised position of the vehicle seating assembly, according to one example.

Referring now to FIGS. 2-4, in various examples, the front actuator assembly 52 may be a linear actuator assembly. For example, the front actuator assembly 52 may be a lead screw based assembly. In one specific example, the front actuator assembly 52 includes a motor 116, a lead shaft 120, a nut 124, and a nut anchor 128. The lead shaft 120 is rotated when the motor 116 is activated. The nut 124 engages the lead shaft 120 such that a position of the nut 124 along the lead shaft 120 is adjusted when the lead shaft 120 is rotated. The nut anchor 128 couples the nut 124 to the seat base 40. The nut anchor 128 may prevent rotation of the nut 124. Accordingly, as the lead shaft 120 is rotated by the motor 116, the nut 124 moves along the lead shaft 120 either toward the motor 116 or away from the motor 116, depending upon a direction of rotation of the lead shaft 120. It is contemplated that lateral sides of the seat base 40 (e.g., left side and right side) may each be provided with the front actuator assembly 52 and/or the rear actuator assembly 56. It is also contemplated that the lateral sides of the seat base 40 may be provided with at least some components of the front actuator assembly 52 and/or the rear actuator assembly 56. For example, each of the lateral sides of the seat base 40 may be provided with the nut anchor 128, the nut 124, and the lead shaft 120, However, in some examples, a single motor 116 may be used to drive each of the lead shafts 120 provided on the lateral sides of the seat base 40 in a simultaneous manner. In such an example, one or more driveshafts may extend from the motor 116 to each of the lead shafts 120 and engage the lead shafts 120 in a way that permits transmission of rotational motion from the driveshaft(s) to the lead shafts 120. In various examples, an entirety of the rear actuator assembly 56 may be provided on each of the lateral sides of the seat base 40.

Referring again to FIGS. 2-4, the lead shaft 120 can define threads that are engaged by the nut 124. The threads defined by the lead shaft 120 can facilitate the movement of the nut 124 along the lead shaft 120, as well as maintain a position of the nut 124 when rotation of the lead shaft 120 is stopped. In various examples, the rear actuator assembly 56 may be a sector gear and pinion arrangement. In one specific example, the rear actuator assembly 56 includes a motor 132, a sector gear 136, and a guide pin 140. The motor 132 is coupled to the seat base 40. The sector gear 136 engages with the motor 132. For example, the sector gear may engage with a drive gear that is driven by a driveshaft of the motor 132. The sector gear 136 defines a slot 144 therein. The guide pin 140 is coupled to the seat base 40 and is received in the slot 144 that is defined by the sector gear 136. As the vehicle seating assembly 32 is transitioned between the various positions, the guide pin 140 may travel along the slot 144 defined by the sector gear 136. When the motor 132 of the rear actuator assembly 56 is activated, the drive gear of the motor 132 begins to rotate and induces motion of the sector gear 136. For example, teeth 148 defined by the sector gear 136 may mesh with teeth defined by the drive gear of the motor 132 such that rotation of the drive gear results in movement of the sector gear 136 relative to the seat base 40. The slot 144 that is defined by the sector gear 136 may be arcuate in shape. An edge of the sector gear 136 that defines the teeth 148 may be arcuate in shape.

Referring to FIGS. 5-8, an angular relationship between the front actuator assembly 52 and the upper track 68 is adjusted as the vehicle seating assembly 32 is transitioned between the design position, the lowered position, the raised position, and/or the reclined-and-raised position. This adjustment in the angular relationship between the front actuator assembly 52 and the upper track 68 can be seen with regard to angle 152. Additionally, in various examples, an angular relationship between the front actuator assembly 52 and the seat base 40 may be adjusted as the vehicle seating assembly 32 is transitioned between the design position, the lowered position, the raised position, and/or the reclined-and-raised position. The adjustment of the angular relationship between the front actuator assembly 52 and the seat base 40 can be seen with regard to angle 156. The angle 152 between the front actuator assembly 52 and the upper track 68 may differ from the angle 156 between the front actuator assembly 52 and the seat base 40 in one or more of the positions chosen from the design position, the lowered position, the raised position, and the reclined-and-raised position. In various examples and/or positions, the angle 152 between the front actuator assembly 52 and the upper track 68 and the angle 156 between the front actuator assembly 52 and the seat base 40 may be equal to one another. Said another way, the angle 152 and the angle 156 may be alternate angles with one another in one or more positions of the vehicle seating assembly 32.

Referring again to FIGS. 5-8, in various examples, an angular relationship between at least one component of the rear actuator assembly 56 and the upper track 68 may be adjusted as the vehicle seating assembly 32 is transitioned between the design position, the lowered position, the raised position, and/or the reclined-and-raised position. For example, an angular relationship between the sector gear 136 and the upper track 68 may be adjusted as the vehicle seating assembly 32 is transitioned between the design position, the lowered position, the raised position, and/or the reclined-and-raised position. The adjustment in the angular relationship between the rear actuator assembly 56 and the upper track 68 is indicated by angle 160. An angular relationship between the at least one component of the rear actuator assembly 56 and the seat base 40 can be adjusted as the vehicle seating assembly 32 is transitioned between the design position, the lowered position, the raised position, and/or the reclined-and-raised position. The adjustment of the angular relationship between the at least one component of the rear actuator assembly 56 and the seat base 40 can be indicated by a change in an angle 164 between the at least one component of the rear actuator assembly 56 and the seat base 40. As stated above, the reclined-and-raised position of the vehicle seating assembly 32 is intended for use when the vehicle 20 is in a stationary (i.e., non-moving) state. For example, while a transmission of the vehicle 20 is in a parked position. However, while all modern OEMs of passenger vehicles currently warn occupants against reclining the vehicle seating assembly 32 past a certain angle while the vehicle 20 is moving and/or in riding in a fully reclined or supine position due to safety concerns, it is anticipated that technology and the regulatory framework may evolve in the future where such an activity is permissible.

Referring further to FIGS. 5-8, in some examples, the at least one component of the rear actuator assembly 56 whose angular relationship between the seat base 40 and/or the upper track 68 is adjusted when the vehicle seating assembly 32 is transitioned between various positions may be the sector gear 136. The sector gear 136 can include an arm 166 that is pivotably coupled to the rear anchor 100. The arm 166 of the sector gear 136 may be the at least one component of the rear actuator assembly 56 whose angular relationship with the seat base 40 and/or the upper track 68 is adjusted as the vehicle seating assembly 32 is transitioned between the various positions. As with the front actuator assembly 52, the angle 160 and the angle 164 may be alternate angles with one another. In some examples, the angle 152 and the angle 156 may be alternate angles relative to one another when the seat base 40 and the upper track 68 are substantially parallel to one another. Similarly, the angle 160 and the angle 164 may be alternate angles relative to one another when the seat base 40 and the upper track 68 are substantially parallel to one another. In such examples, the lead shaft 120 of the front actuator assembly 52 may represent a positioning of a line 168 that extends through the lead shaft 120 with this line being bisected by the seat base 40 and the upper track 68 in at least some positions of the vehicle seating assembly 32. In a similar manner, the arm 166 of the sector gear 136 may represent a positioning of a line 170 extending therethrough that is bisected by the seat base 40 and the upper track 68. Inlays are provided in the upper right and upper left of FIGS. 5-8 to indicate the angular relationship of the front actuator assembly 52 and the rear actuator assembly 56, respectively, in the various positions.

Referring still further to FIGS. 5-8, transitioning from the design position (FIG. 5) to the reclined-and-raised position (FIG. 8) includes adjusting a position of the nut 124 along the lead shaft 120 of the front actuator assembly 52 such that the nut 124 moves away from the motor 116. Transitioning the vehicle seating assembly 32 from the design position to the reclined-and-raised position also includes rotating the front actuator assembly 52 away from the upper track 68. Accordingly, the angle 152 between the front actuator assembly 52 and the upper track 68 may increase when the vehicle seating assembly 32 is transitioned from the design position to the reclined-and-raised position. Transitioning the vehicle seating assembly 32 from the design position to the reclined-and-raised position may include rotating the sector gear 136 of the rear actuator assembly 56 toward the upper track 68. Accordingly, the angle 160 between the rear actuator assembly 56 and the upper track 68 may decrease when the vehicle seating assembly 32 is transitioned from the design position to the reclined-and-raised position. As stated above, the reclined-and-raised position of the vehicle seating assembly 32 is intended for use when the vehicle 20 is in a stationary (i.e., non-moving) state. For example, while a transmission of the vehicle 20 is in a parked position. However, while all modern OEMs of passenger vehicles currently warn occupants against reclining the vehicle seating assembly 32 past a certain angle while the vehicle 20 is moving and/or in riding in a fully reclined or supine position due to safety concerns, it is anticipated that technology and the regulatory framework may evolve in the future where such an activity is permissible.

Referring yet again to FIGS. 5-8, transitioning the vehicle seating assembly 32 from the design position to the reclined-and-raised position can include decreasing the distance 84 between the underside 88 of the rearward region 64 of the seat base 40 and the upper track 68. Additionally, transitioning the vehicle seating assembly 32 from the design position to the reclined-and-raised position can include increasing the distance 76 between the underside 80 of the forward region 60 of the seat base 40 and the upper track 68. When the vehicle seating assembly 32 is in the design position, the lowered position, and/or the raised position, the distance 76 between the underside 80 of the forward region 60 and the upper track 68 may be substantially equal to the distance 84 between the underside 88 of the rearward region 64 of the upper track 68.

Referring further to FIGS. 5-8, when the vehicle seating assembly 32 is in the lowered position, the guide pin 140 of the rear actuator assembly 56 may directly abut a lower extreme 172 of the slot 144 that is defined by the sector gear 136. In the raised position, the guide pin 140 of the rear actuator assembly 56 may directly abut an upper extreme 176 of the slot 144 that is defined by the sector gear 136. The design position and the reclined-and-raised position of the vehicle seating assembly 32 may position the guide pin 140 within the slot 144 at intermediate locations between the lower extreme 172 and the upper extreme 176. In various examples, the guide pin 140 of the rear actuator assembly 56 may be positioned closer to the lower extreme 172 of the slot 144 when the vehicle seating assembly 32 is in the reclined-and-raised position than when the vehicle seating assembly 32 is in the design position. The sector gear 136 may be rotatable relative to the rear anchor 100 and the seat base 40, For example, the positioning of an aperture 178 that is defined by the sector gear 136 may change as the vehicle seating assembly 32 is transitioned between the various positions. As stated above, the reclined-and-raised position of the vehicle seating assembly 32 is intended for use when the vehicle 20 is in a stationary (i.e., non-moving) state. For example, while a transmission of the vehicle 20 is in a parked position. However, while all modern OEMs of passenger vehicles currently warn occupants against reclining the vehicle seating assembly 32 past a certain angle while the vehicle 20 is moving and/or in riding in a fully reclined or supine position due to safety concerns, it is anticipated that technology and the regulatory framework may evolve in the future where such an activity is permissible.

Referring still further to FIGS. 5-8, the positioning of the nut 124 along the lead shaft 120 of the front actuator assembly 52 may remain the same between the design position, the lowered position, and/or the raised position of the vehicle seating assembly 32. In such examples, actuation of the rear actuator assembly 56, in addition to rotation of the front actuator assembly 52 relative to the front anchor 96, may provide the requisite adjustment of the distance 76 between the underside 80 of the forward region 60 of the seat base 40 and the upper track 68 that corresponds with the adjustment between the given positions. While the positioning of the nut 124 along the lead shaft 120 may remain constant for the design position, the lowered position, and/or the raised position of the vehicle seating assembly 32, the rotation of the front actuator assembly 52 relative to the front anchor 96 can result in a change in a position of the forward region 60 of the seat base 40 in the longitudinal direction that is indicated by the arrow 104.

Figure 8:
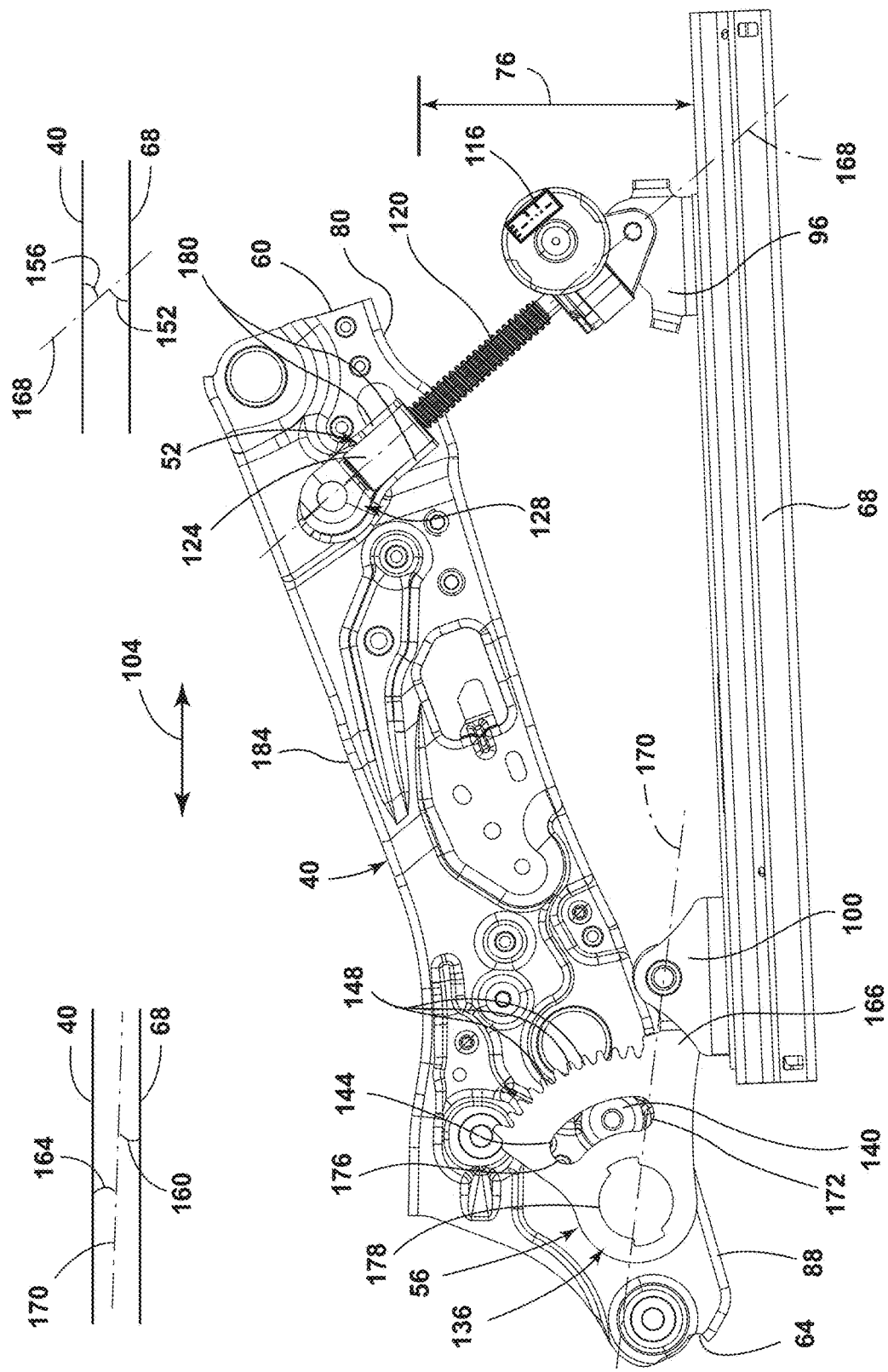
FIG. 8 is a side view of the seat base, the portion of the track assembly, the front actuator assembly, and the rear actuator assembly, illustrating the reclined-and-raised position of the vehicle seating assembly, according to one example.

Referring yet again to FIGS. 5-8, the nut anchor 128 of the front actuator assembly 52 may be provided with one or more flanges 180 that engage with the nut 124 and prevent the nut 124 from rotating relative to the lead shaft 120. In some examples, a slope of an upper surface 184 of the seat base 40 may vary between the design position, the lowered position, the raised position, and/or the reclined-and-raised position of the vehicle seating assembly 32. For example, the slope of the upper surface 184 of the seat base 40 may be greater when the vehicle seating assembly 32 is in the lowered position when compared to the design position and the raised position. In some examples, the slope of the upper surface 184 of the seat base 40 may be substantially the same when the vehicle seating assembly 32 is in the design position and the raised position. In some examples, the slope of the upper surface 184 of the seat base 40 may be greatest when the vehicle seating assembly 32 is in the reclined-and-raised position when compared to the design position, the lowered position, and the raised position. However, the reclined-and-raised position of the vehicle seating assembly 32 may not represent the greatest possible slope of the upper surface 184 of the seat base 40 from the standpoint of a full range of motion of the front actuator assembly 52 and the rear actuator assembly 56, as can be seen in FIG. 8. For example, the greatest slope of the upper surface 184 of the seat base 40 may be accomplished when the front actuator assembly 52 is positioned with the nut 124 at a location along the lead shaft 120 that is furthest from the motor 116 and the rear actuator assembly 56 is positioned with the guide pin 140 directly abutting the lower extreme 172 of the slot 144 that is defined by the sector gear 136.

As stated above, the reclined-and-raised position of the vehicle seating assembly 32 is intended for use when the vehicle 20 is in a stationary (i.e., non-moving) state. For example, while a transmission of the vehicle 20 is in a parked position. However, while all modern OEMs of passenger vehicles currently warn occupants against reclining the vehicle seating assembly 32 past a certain angle while the vehicle 20 is moving and/or in riding in a fully reclined or supine position due to safety concerns, it is anticipated that technology and the regulatory framework may evolve in the future where such an activity is permissible.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
   a seat base having a forward region and a rearward region;
   a seatback that is pivotably coupled to the seat base proximate to the rearward region;
   a track assembly coupled to the seat base, wherein the track assembly comprises an upper track and a lower track, and wherein the upper track is movable relative to the lower track;
   a front actuator assembly that couples the seat base to the upper track proximate to the forward region, wherein the front actuator assembly adjusts a distance between an underside of the forward region of the seat base and the upper track; and
   a rear actuator assembly that couples the seat base to the upper track proximate to the rearward region, wherein the rear actuator assembly adjusts a distance between an underside of the rearward region of the seat base and the upper track, wherein the vehicle seating assembly is movable between a design position, a lowered position, a raised position, and a reclined-and-raised position by adjusting at least one component chosen from the front actuator assembly and the rear actuator assembly, wherein an angular relationship between at least one component of the rear actuator assembly and the upper track is adjusted as the vehicle seating assembly is transitioned between the design position, the lowered position, the raised position, and the reclined-and-raised position, and wherein an angular relationship between the at least one component of the rear actuator assembly and the seat base is adjusted as the vehicle seating assembly is transitioned between the design position, the lowered position, the raised position, and the reclined-and-raised position.

2. The vehicle seating assembly of claim 1, wherein an angular relationship between the front actuator assembly and the upper track is adjusted as the vehicle seating assembly is transitioned between the design position, the lowered position, the raised position, and the reclined-and-raised position.

3. The vehicle seating assembly of claim 2, wherein an angular relationship between the front actuator assembly and the seat base is adjusted as the vehicle seating assembly is transitioned between the design position, the lowered position, the raised position, and the reclined-and-raised position.

4. A vehicle seating assembly, comprising:
   a seat base having a forward region and a rearward region;
   a seatback that is pivotably coupled to the seat base proximate to the rearward region;
   a track assembly coupled to the seat base, wherein the track assembly comprises an upper track and a lower track, and wherein the upper track is movable relative to the lower track;
   a front actuator assembly that couples the seat base to the upper track proximate to the forward region, wherein the front actuator assembly adjusts a distance between an underside of the forward region of the seat base and the upper track; and
   a rear actuator assembly that couples the seat base to the upper track proximate to the rearward region, wherein the rear actuator assembly adjusts a distance between an underside of the rearward region of the seat base and the upper track, wherein the vehicle seating assembly is movable between a design position, a lowered position, a raised position, and a reclined-and-raised position by adjusting at least one component chosen from the front actuator assembly and the rear actuator assembly, and wherein the front actuator assembly is a linear actuator assembly.

5. The vehicle seating assembly of claim 4, wherein the front actuator assembly comprises:
   a motor;
   a lead shaft that is rotated when the motor is activated;
   a nut that engages the lead shaft such that a position of the nut along the lead shaft is adjusted when the lead shaft is rotated; and
   a nut anchor that couples the nut to the seat base, wherein the nut anchor prevents rotation of the nut.

6. The vehicle seating assembly of claim 5, wherein the rear actuator assembly is a sector gear and pinion arrangement.

7. The vehicle seating assembly of claim 6, wherein the rear actuator assembly comprises:
   a motor that is coupled to the seat base;
   a sector gear that engages with the motor, wherein the sector gear defines a slot; and
   a guide pin that is coupled to the seat base, wherein the guide pin is received in the slot defined by the sector gear.

8. The vehicle seating assembly of claim 7, wherein transitioning from the design position to the reclined-and-raised position comprises:
   adjusting a position of the nut along the lead shaft of the front actuator assembly such that the nut moves away from the motor;
   rotating the front actuator assembly away from the upper track; and
   rotating the sector gear of the rear actuator assembly toward the upper track.

9. The vehicle seating assembly of claim 1, wherein transitioning from the design position to the reclined-and-raised position comprises decreasing a distance between the rearward region of the seat base and the upper track, as well as increasing a distance between the forward region of the seat base and the upper track.

10. A vehicle seating assembly, comprising:
   a seat base having a forward region and a rearward region;
   a seatback that is pivotably coupled to the seat base proximate to the rearward region;
   a track assembly coupled to the seat base, wherein the track assembly comprises an upper track and a lower track, and wherein the upper track is movable relative to the lower track;
   a front actuator assembly that couples the seat base to the upper track proximate to the forward region, wherein the front actuator assembly adjusts a distance between an underside of the forward region of the seat base and the upper track, wherein an angular relationship between the front actuator assembly and the upper track is adjusted as the vehicle seating assembly is transitioned between the design position, the lowered position, the raised position, and the reclined-and-raised position, and wherein an angular relationship between the front actuator assembly and the seat base is adjusted as the vehicle seating assembly is transitioned between the design position, the lowered position, the raised position, and the reclined-and-raised position; and
   a rear actuator assembly that couples the seat base to the upper track proximate to the rearward region, wherein the rear actuator assembly adjusts a distance between an underside of the rearward region of the seat base and the upper track, and wherein the vehicle seating assembly is movable between a design position, a lowered position, a raised position, and a reclined-and-raised position by adjusting at least one component chosen from the front actuator assembly and the rear actuator assembly.

11. The vehicle seating assembly of claim 10, wherein an angular relationship between the rear actuator assembly and the upper track is adjusted as the vehicle seating assembly is transitioned between the design position, the lowered position, the raised position, and the reclined-and-raised position.

12. The vehicle seating assembly of claim 11, wherein an angular relationship between the front actuator assembly and the seat base is adjusted as the vehicle seating assembly is transitioned between the design position, the lowered position, the raised position, and the reclined-and-raised position.

13. The vehicle seating assembly of claim 10, wherein the front actuator assembly is a linear actuator assembly.

14. The vehicle seating assembly of claim 13, wherein the front actuator assembly comprises:
   a motor;
   a lead shaft that is rotated when the motor is activated;
   a nut that engages the lead shaft such that a position of the nut along the lead shaft is adjusted when the lead shaft is rotated; and
   a nut anchor that couples the nut to the seat base, wherein the nut anchor prevents rotation of the nut.

15. The vehicle seating assembly of claim 14, wherein the rear actuator assembly is a sector gear and pinion arrangement.

16. The vehicle seating assembly of claim 15, wherein the rear actuator assembly comprises:
   a motor that is coupled to the seat base;
   a sector gear that engages with the motor, wherein the sector gear defines a slot; and
   a guide pin that is coupled to the seat base, wherein the guide pin is received in the slot defined by the sector gear.

17. The vehicle seating assembly of claim 15, wherein transitioning from the design position to the reclined-and-raised position comprises:
   adjusting a position of the nut along the lead shaft of the front actuator assembly such that the nut moves away from the motor;
   rotating the front actuator assembly away from the upper track; and
   rotating the sector gear of the rear actuator assembly toward the upper track.

18. The vehicle seating assembly of claim 10, wherein transitioning from the design position to the reclined-and-raised position comprises decreasing a distance between the rearward region of the seat base and the upper track, as well as increasing a distance between the forward region of the seat base and the upper track.

* * * * *